US012596285B2

(12) United States Patent
Chiu et al.

(10) Patent No.: US 12,596,285 B2
(45) Date of Patent: Apr. 7, 2026

(54) PIXEL STRUCTURE

(71) Applicant: PlayNitride Display Co., Ltd., Zhunan Township, Miaoli County (TW)

(72) Inventors: Po-Wei Chiu, Zhunan Township (TW); Sheng-Yuan Sun, Zhunan Township (TW); Hoong Lien Lai, Zhunan Township (TW)

(73) Assignee: PLAYNITRIDE DISPLAY CO., LTD., Zhunan Township, Miaoli County (TW)

( * ) Notice: Subject to any disclaimer, the term of this patent is extended or adjusted under 35 U.S.C. 154(b) by 285 days.

(21) Appl. No.: 18/532,372

(22) Filed: Dec. 7, 2023

(65) Prior Publication Data

US 2025/0138381 A1 May 1, 2025

(30) Foreign Application Priority Data

Oct. 27, 2023 (TW) .................................. 112141200

(51) Int. Cl.
*G02F 1/1677* (2019.01)
*G02F 1/157* (2006.01)

(52) U.S. Cl.
CPC ............ *G02F 1/1677* (2019.01); *G02F 1/157* (2013.01); *G02F 2201/44* (2013.01)

(58) Field of Classification Search
CPC ..... G02F 1/157; G02F 1/1677; G02F 2201/44
USPC ....................................................... 359/265
See application file for complete search history.

(56) References Cited

U.S. PATENT DOCUMENTS 6,462,859 B1 10/2002 Bastiaens et al.
2021/0132265 A1* 5/2021 Sun .......................... G02B 7/08

FOREIGN PATENT DOCUMENTS

TW 202006403 A 2/2020

OTHER PUBLICATIONS

Taiwanese Office Action and Search Report for Taiwanese Application No. 112141200, dated Aug. 27, 2024.

* cited by examiner

*Primary Examiner* — Bumsuk Won
*Assistant Examiner* — Mitchell T Oestreich
(74) *Attorney, Agent, or Firm* — Birch, Stewart, Kolasch & Birch, LLP

(57) ABSTRACT

A pixel structure is provided. The pixel structure includes a substrate, a micro light-emitting diode, and an electrophoretic structure. The micro light-emitting diode is disposed on the substrate and configured to emit light. The electrophoretic structure is disposed on the micro light-emitting diode and includes an upper electrode, a lower electrode, an electrophoretic medium, and an electrophoretic lens. The electrophoretic medium is disposed between the upper electrode and the lower electrode, wherein the electrophoretic medium has a first refractive index. The electrophoretic lens is disposed in the electrophoretic medium and has a second refractive index that is different from the first refractive index. The electrophoretic lens is configured to move away from or toward the micro light-emitting diode by being driven by the electric field, so that light passing through the electrophoretic lens has a first or second divergence angle after refracting.

17 Claims, 12 Drawing Sheets

PIXEL STRUCTURE

CROSS REFERENCE TO RELATED APPLICATIONS

This application claims priority of Taiwan Patent Application No. 112141200, filed on Oct. 27, 2023, the entirety of which is incorporated by reference herein.

BACKGROUND OF THE INVENTION

Field of the Invention

The present disclosure is related to a pixel structure, and in particular, it is related to a pixel structure on which the divergence angle is capable of being adjusted.

Description of the Related Art

With the wide application of electronic devices, people's requirements for them have gradually increased. For example, existing display devices usually provide display images to users located directly in front of them. In other words, for a user who is located diagonally in front of a display device, user experience may suffer due to the insufficient divergence angle of the display device. Therefore, although the pixel structures of existing display devices have largely met their intended purposes, they do not meet requirements in all respects. Therefore, there are still some issues to overcome regarding pixel structure.

BRIEF SUMMARY OF THE INVENTION

In some embodiments, a pixel structure is provided. The pixel structure includes a substrate, a micro light-emitting diode and an electrophoretic structure. The micro light-emitting diode is disposed on the substrate, wherein the micro light-emitting diode emits a light. The electrophoretic structure is disposed on the micro light-emitting diode, wherein the electrophoretic structure includes an upper electrode, a lower electrode, an electrophoretic medium, and an electrophoretic lens. The upper electrode and the lower electrode form an electric field. The electrophoretic medium is disposed between the upper electrode and the lower electrode, wherein the electrophoretic medium has a first refractive index. The electrophoretic lens is disposed in the electrophoretic medium, wherein the electrophoretic lens has a second refractive index, and the second refractive index is different from the first refractive index. The electrophoretic lens moves away from or toward the micro light-emitting diode by being driven by an electrostatic force generated by the electric field, so that the light passing through the electrophoretic lens has a first divergence angle or a second divergence angle after refracting, and the first divergence angle is different from the second divergence angle.

In some embodiments, a pixel structure is provided. The pixel structure includes a substrate, a first micro light-emitting diode, a second micro light-emitting diode, a first electrophoretic structure, and a second electrophoretic structure. The first micro light-emitting diode and a second micro light-emitting diode are disposed on the substrate, wherein the first micro light-emitting diode and the second micro light-emitting diode respectively emit a first light and a second light with the same color. The first electrophoretic structure and a second electrophoretic structure respectively are disposed on the first micro light-emitting diode and the second micro light-emitting diode, wherein the first electrophoretic structure and the second electrophoretic structure respectively includes an upper electrode, a lower electrode, an electrophoretic medium, and an electrophoretic lens, and an electrochromic structure. The upper electrode and a lower electrode form an electric field. The electrophoretic medium is disposed between the upper electrode and the lower electrode, wherein the electrophoretic medium has a first refractive index. The electrophoretic lens is disposed in the electrophoretic medium, wherein the electrophoretic lens has a second refractive index, and the second refractive index is different from the first refractive index. The electrochromic structure is disposed between the first electrophoretic structure and the second electrophoretic structure and selectively switched between a transparent state or an opaque state, wherein the opaque state is used to shield a part of the first light and the second light. The electrophoretic lens of the first electrophoretic structure moves away from or toward the first micro light-emitting diode by being driven by an electrostatic force generated by the electric field, so that the first light passing through the first electrophoretic structure has a first divergence angle or a second divergence angle after refracting, and the first divergence angle is different from the second divergence angle. The electrophoretic lens of the second electrophoretic structure moves away from or toward the second micro light-emitting diode by being driven by an electrostatic force generated by the electric field, so that the second light passing through the second electrophoretic structure has a third divergence angle or a fourth divergence angle after refracting, and the third divergence angle is different from the fourth divergence angle.

The pixel structure of the present disclosure can be applied to various types of electronic devices. In order to make the features and advantages of the present disclosure more comprehensible, various embodiments are specially cited below, together with the accompanying drawings, to be described in detail as follows.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
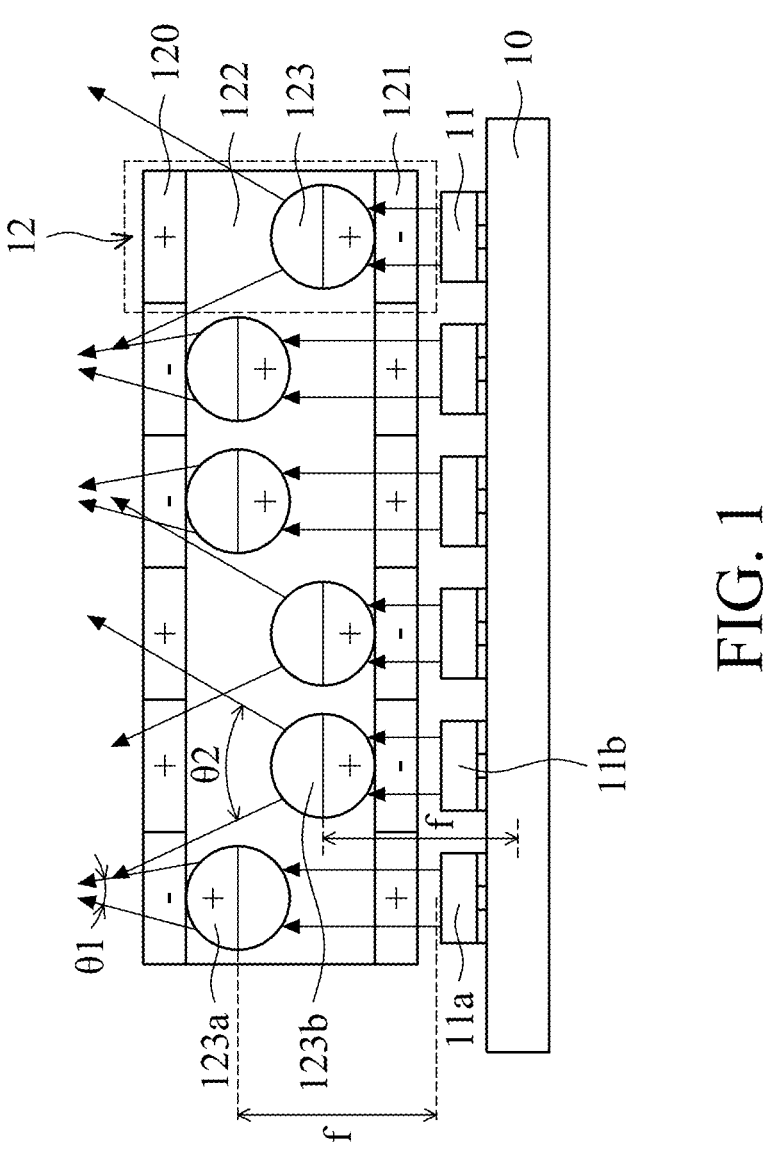
FIG. 1 is a schematic diagram of the pixel structure according to some embodiments of the present disclosure.

The following disclosure provides many different embodiments or examples for implementing the provided pixel structure. Specific examples of features and their configurations are described below to simplify the embodiments of the present disclosure, but certainly not to limit the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In some embodiments of the present disclosure, terms about disposing and connecting, such as "disposing", "connecting" and similar terms, unless otherwise specified, may refer to two features are in direct contact with each other, or may also refer to two features are not in direct contact with each other, wherein there is an additional connect feature between the two features. The terms about disposing and connecting may also include the case where both features are movable, or both features are fixed.

In addition, ordinal numbers such as "first", "second", and the like used in the specification and claims are configured to modify different features or to distinguish different embodiments or ranges, rather than to limit the number, the upper or lower limits of features, and are not intended to limit the order of manufacture or arrangement of features.

Herein, the terms "approximately", "about", and "substantially" generally mean within 10%, within 5%, within 3%, within 2%, within 1%, or within 0.5% of a given value or range. The given value is an approximate value, that is, "approximately", "about", and "substantially" can still be implied without the specific description of "approximately", "about", and "substantially". The phrase "a range between a first value and a second value" means that the range includes the first value, the second value, and other values in between. Furthermore, any two values or directions used for comparison may have certain tolerance. If the first value is equal to the second value, it implies that there may be a tolerance within about 10%, within 5%, within 3%, within 2%, within 1%, or within 0.5% between the first value and the second value. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

Unless otherwise defined, all terms (including technical and scientific terms) used herein have the same meaning as commonly understood by one of ordinary skill in the art. It should be understood that these terms, such as those defined in commonly used dictionaries, should be interpreted as having meanings consistent with the background or context of the related technology and the present disclosure, and should not be interpreted in an idealized or overly formal manner, unless otherwise specified in the embodiments of the present disclosure.

It should be noted that, for clarity of explanation, some features of the device are omitted in the drawings, and only some features are schematically illustrated. In some embodiments, additional components may be added to the electronic device of the present disclosure. In some embodiments, some components of the electronic device disclosed herein may be replaced or omitted. In some embodiments, additional processing steps may be provided before, during, and/or after a manufacturing method of an electronic device. In some embodiments, some of the described processing steps may be replaced or omitted, and the order of some of the described processing steps may be interchangeable. Furthermore, it should be understood that some of the described processing steps may be replaced or deleted for other embodiments of the method.

In the prior art, the pixel structure may include a light-emitting diode (LED) and a functional layer located thereon. For example, the light-emitting diode may be a micro light-emitting diode (micro LED) or another suitable light-emitting diode, and the functional layer may be or include a filter, an anti-reflection layer, a light guide layer, a combination thereof, or another suitable functional layer, but the present disclosure is not limited thereto. However, these pixel structures only have a single divergence angle, which limits the application of display devices.

To this end, the present disclosure provides a pixel structure that may adjust the divergence angle so that the display image may correspond to users at different viewing locations (for example, directly in front or diagonally in front). In some cases, the display device using this pixel structure may also display different display images at the same time to correspond to users on both sides of the display device. For example, a car display device may display different display images in a single display area to the driver's seat and the passenger's seat of the car to provide a better user experience. It should be noted that the different display images described in the present disclosure are presented according to the viewing angle, rather than the split screen in the prior art.

FIG. 1 is a schematic diagram of the pixel structure according to some embodiments of the present disclosure. In these embodiments, the pixel structure 1 may be used as a single sub-pixel, and multiple sub-pixels (e.g., red sub-pixel, blue sub-pixel, green sub-pixel) may form one pixel. As shown in the figure, the pixel structure 1 includes the substrate 10, and the substrate 10 carries electronic components thereon (for example, the micro light-emitting diode 11 and the electrophoretic structure 12 to be mentioned below). In some embodiments, the substrate 10 may be a printed circuit board (PCB), thin film transistor glass (TFT glass), a complementary metal oxide semiconductor (CMOS) substrate, or another suitable substrate, but the present disclosure is not limited thereto.

As shown in FIG. 1, the pixel structure 1 further includes the micro light-emitting diode (μLED) 11 that emits light. For example, the micro light-emitting diode 11 may be a green LED chip, and the green LED chip emits green visible light with a wavelength between 495 nm and 570 nm. Alternatively, the micro light-emitting diode 11 may be a red LED chip, and the red LED chip emits red visible light with a wavelength between 620 nm and 750 nm. Alternatively, the micro light emitting diode 11 may be a blue LED chip, and the blue LED chip emits blue visible light with a wavelength between 450 nm and 495 nm. However, the present disclosure is not limited to the above three colors of LED chips. In other embodiments, the micro light-emitting diodes 11 may also be LED chips of other colors.

As shown in FIG. 1, the pixel structure 1 further includes the electrophoretic structure 12 that is disposed on the micro light-emitting diode 11. Specifically, the electrophoretic structure 12 adjusts the divergence angle of the light emitted by the micro light-emitting diode 11 to achieve some beneficial effects as described above.

In some embodiments, the electrophoretic structure 12 includes the upper electrode 120 and the lower electrode 121, and the upper electrode 120 and the lower electrode 121 are disposed on the micro light-emitting diode 11. Specifically, the upper electrode 120 and the lower electrode 121 form a specific electric field, and the specific electric field may be used to drive the electrophoretic lens 123 located therein (which will be described in detail below). In some embodiments, the upper electrode 120 and the lower electrode 121 may be or may include transparent conductive oxide (TCO). For example, the transparent conductive oxide may be or may include indium tin oxide (ITO), antimony zinc oxide (AZO), tin oxide (SnO), zinc oxide (ZnO), indium zinc oxide (IZO), indium gallium zinc oxide (IGZO), indium tin zinc oxide (ITZO), antimony tin oxide (ATO), a combination thereof, or another suitable transparent conductive material, but the present disclosure is not limited thereto. In some embodiments, the material of the upper electrode 120 and the lower electrode 121 may be similar or the same, but the present disclosure is not limited thereto.

In some embodiments, the electrophoretic structure 12 further includes the electrophoretic medium 122, and the electrophoretic medium 122 is disposed between the upper electrode 120 and the lower electrode 121. Specifically, the electrophoretic medium 122 serves as a medium in which the electrophoretic lens 123 (described in detail below) may move. In some embodiments, the electrophoretic medium 122 may be a colorless fluid that is completely or partially transparent. For example, the electrophoresis medium 122 may be or may include: hydrocarbons, such as isoparaffin, decahydronaphthalene (DECALIN), fatty oils, paraffin oil, or silicone fluid; aromatic hydrocarbons, such as toluene, xylene, phenylxylylethane, dodecylbenzene, or alkylnaphthalene; halogenated solvents, such as perfluorodecalin, perfluorotoluene, perfluoroxylene, dichlorobenzotrifluoride, 3,4,5-trichlorobenzotrifluoride, chloropentafluorobenzene, dichlorononane, or pentachlorobenzene; a combination thereof; or another suitable solution, but the present disclosure is not limited thereto.

In some embodiments, the electrophoretic medium 122 has a first refractive index. For example, the first refractive index may be greater than 1.5. For example, the first refractive index may be 1.6, 1.7, 1.8, 1.9, 2.0, 2.5, 3.0, greater than 3.0, or any value or any range between the above values, but the present disclosure is not limited thereto. In other embodiments, the first refractive index may be less than 1.5. For example, the first refractive index may be 1.45, 1.40, 1.35, 1.30, 1.25, 1.2, 1.1, 1.0, or any value or any range between the above values, but the present disclosure is not limited thereto.

In some embodiments, the electrophoretic structure 12 further includes the electrophoretic lens 123, and the electrophoretic lens 123 is disposed in the electrophoretic medium 122. Specifically, the electrophoretic lens 123 moves away from or toward the micro light-emitting diode 11 according to the electric field generated by the upper electrode 120 and the lower electrode 121, so that the light passing through it has different divergence angles. For example, when the electrophoretic lens 123 (e.g., electrophoretic lens 123*a*) is away from the micro light-emitting diode 11, the light passing through the electrophoretic lens 123 (e.g., electrophoretic lens 123*a*) has the first divergence angle θ1. On the contrary, when the electrophoretic lens 123 (for example, the electrophoretic lens 123*b*) is close to the micro light-emitting diode 11, the light passing through the electrophoretic lens 123 (for example, the electrophoretic lens 123*b*) has the second divergence angle θ2, and the first divergence angle θ1 is different from the second divergence angle θ2. It should be noted that, in order to effectively refract all or most of the light, the projection area of the electrophoretic lens 123 accounts for at least 50% of the projection area of the light on a projection surface. For example, the projection area of the electrophoretic lens 123 accounts for 60%, 70%, 80%, 90%, 95%, 99%, or any value or any range between the above values, but the present disclosure is not limited thereto. In some embodiments, the diameter of the electrophoretic lens 123 ranges from 5 nm to 30 μm.

In some embodiments, the electrophoretic lens 123 may be or may include fully or partially transparent organic or inorganic material. The inorganic material may be or may include glass, sapphire, rhinestone, fused silica, calcium fluoride ($CaF_2$), titanium dioxide, silicon nitride, rutile, titania, anatase, barium sulfate, zirconium oxide, kaolin, zinc oxide, a combination thereof, or another suitable inorganic material, but the present disclosure is not limited thereto. The organic material may be or may include polyethylene (PE), polymethylmethacrylate, polystyrene (PS), polycarbonate (PC), epoxy resin, or another suitable organic material, but the present disclosure is not limited thereto.

In some embodiments, the electrophoretic lens 123 may be or may include a material having an electric dipole. For example, the electrophoretic lens 123 may include organic material or inorganic material such as those mentioned above, and material such as charge control agent as charged coatings are used to make both ends (or both sides) of the organic material or inorganic material have opposite charges. For example, the charge control agent may be ionic or nonionic.

In some embodiment, the ionic surfactant (i.e., the ionic charge control agent) may include an anionic surfactant or a cationic surfactant. The anionic surfactant may include: alkane carboxylic salt; alkane sulfonic salt; alkyl-aromatic sulfonic salt, such as dodecyl sodium dodecylbenzenesulfonate; isopropylamine; alkyl benzene sulfonate, phosphate, phosphoric salt; a combination thereof; or another suitable anionic surfactant, but the present disclosure is not limited thereto. The cationic surfactant may include: fatty amine salt, quaternary ammonium salt, alkyl pyridium salt, a combination thereof, or another suitable anionic surfactant, but the present disclosure is not limited thereto. In some embodiment, the nonionic surfactant (i.e., the nonionic charge control agent) may include: sorbitan monoester, polyethoxylated nonionic, polybutene succinimide, maleic anhydride copolymer, vinylpyridine copolymer, vinylpyrrolidone copolymer, (meth)acrylic acid copolymer, N,N-dimethylaminoethyl (meth)acrylate copolymer, a combination thereof, or another suitable nonionic surfactant, but the present disclosure is not limited thereto.

It should be noted that although it is mentioned above that the electrophoretic lens 123 may be composed of a non-charged lens body (e.g., glass) and a charged material (e.g., the charge control agent) thereon, the present disclosure is not limited thereto. In other embodiments, the electrophoretic lens 123 may also be composed of a single material that has an electric dipole moment, such as a liquid crystal molecule. In this way, the electrophoretic lens 123 may be driven by the electrostatic force generated by the electric field, thereby moving closer to or away from the micro light-emitting diode 11.

In some embodiments, the electrophoretic lens 123 has a second refractive index, and the second refractive index of the electrophoretic lens 123 is different from the first refractive index of the electrophoretic medium 122. For example, when the first refractive index of the electrophoretic medium 122 is greater than 1.5, the second refractive index of the electrophoretic lens 123 may be less than 1.5. For example, the second refractive index may be 1.45, 1.40, 1.35, 1.30, 1.25, 1.2, 1.1, 1.0, or any value or any range between the above values, but the present disclosure is not limited thereto. On the contrary, when the first refractive index of the electrophoretic medium 122 is less than 1.5, the second refractive index of the electrophoretic lens 123 may be greater than 1.5. For example, the second refractive index may be 1.6, 1.7, 1.8, 1.9, 2.0, 2.5, 3.0, greater than 3.0, or any value or any range between the above values, but the present disclosure is not limited thereto. Since the two-phase interface between the electrophoretic lens 123 and the electrophoretic medium 122 has a refractive index difference, the path of the light passing through the two-phase interface may be bent (e.g., refracted).

As shown in FIG. 1, take the electrophoretic lens 123a and the electrophoretic lens 123b are spherical convex lenses with a refractive index greater than that of the electrophoretic medium 122 as an example. When the distance between the electrophoretic lens 123a and the micro light-emitting diode 11a is greater than the focal length f (for example, at one point and five times the focal length (1.5f), at twice the focal length (2f), or at three times the focal length (3f)), the light passing through the electrophoretic lens 123a has the first divergence angle θ1. On the contrary, when the distance between the electrophoretic lens 123b and the micro light-emitting diode 11b is less than the focal length f, the light passing through the electrophoretic lens 123b has the second divergence angle θ2, and the second divergence angle θ2 is greater than the first divergence angle θ1. In some embodiments, the state in which the light is converged by the electrophoretic lens 123a may be called the convergence model of the pixel structure 1, and the state in which the light is diverged by the electrophoretic lens 123b may be called the divergence model of the pixel structure 1.

Figure 2:
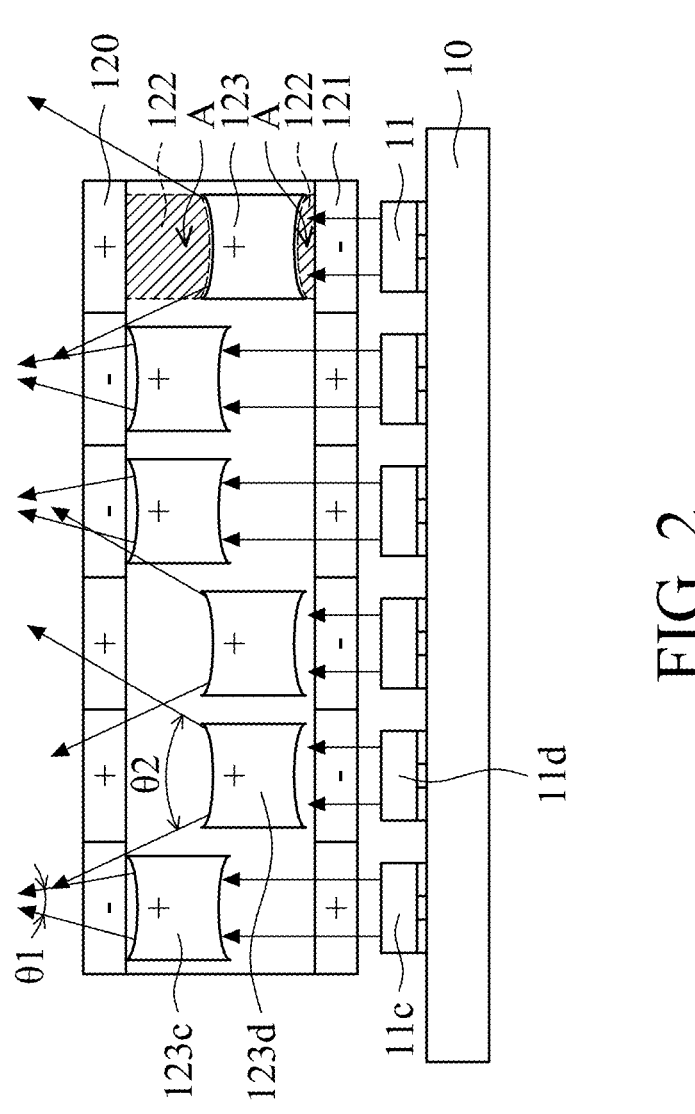
FIG. 2 is a schematic diagram of the pixel structure according to other embodiments of the present disclosure.

FIG. 2 is a schematic diagram of the pixel structure according to other embodiments of the present disclosure. As shown in the figure, take the electrophoretic lens 123c and the electrophoretic lens 123d are biconcave lenses with a smaller refractive index than the electrophoretic medium 122 as an example. In these embodiments, since the first refractive index of the electrophoretic medium 122 is greater than the second refractive index of the electrophoretic lens 123, both interfaces between the electrophoretic medium 122 and the electrophoretic lens 123 in area A may be regarded as substantially optical single convex lens. In this way, when the electrophoretic lens 123c is away from the micro light-emitting diode 11c, the light passing through the electrophoretic lens 123 has the first divergence angle θ1. On the contrary, when the electrophoretic lens 123b is close to the micro light-emitting diode 11d, the light passing through the electrophoretic lens 123d has the second divergence angle θ2, and the second divergence angle θ2 is greater than the first divergence angle θ1. Similar to the embodiments shown in FIG. 1, the state in which the light is converged by the electrophoretic lens 123c may be called the convergence mode of the pixel structure 1, and the state in which the light is diverged by the electrophoretic lens 123d may be called the divergence mode of the pixel structure 1.

It should be noted that in these embodiments, the second refractive index of the electrophoretic lens 123 needs to be less than the first refractive index of the electrophoretic medium 122 (to be equivalently regarded as an optical convex lens). Otherwise, when the second refractive index of the electrophoretic lens 123 is greater than the first refractive index of the electrophoretic medium 122, the interface between the electrophoretic lens 123 and the electrophoretic lens 123 is essentially an optical concave lens rather than an optical convex lens. According to the imaging principle, concave lenses cannot produce magnified images. As a result, this pixel structure cannot make the divergence angle of the light after refraction larger than the divergence angle of the light before refraction.

Figure 3:
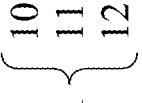
FIG. 3 is a schematic diagram of the pixel structure according to still other embodiments of the present disclosure.
Figure 3:
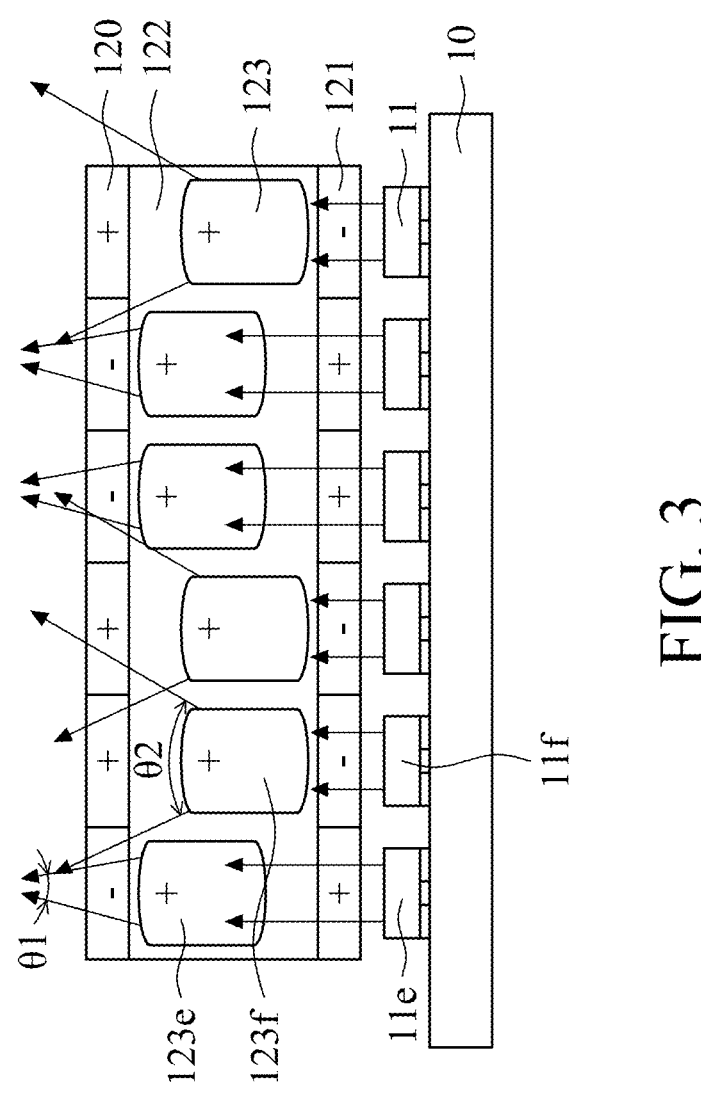

FIG. 3 is a schematic diagram of the pixel structure according to still other embodiments of the present disclosure. As shown in the figure, take the electrophoretic lens 123e and the electrophoretic lens 123f are cylindrical convex lenses with a refractive index greater than that of the electrophoretic medium 122 as an example. When the distance between the electrophoretic lens 123e and the micro light-emitting diode 11e is greater than the focal length f, the light passing through the electrophoretic lens 123e has the first divergence angle θ1. On the contrary, when the distance between the electrophoretic lens 123f and the micro light-emitting diode 11f is less than the focal length f, the light passing through the electrophoretic lens 123f has the second divergence angle θ2, and the second divergence angle θ2 is greater than the first divergence angle θ1. Similar to the embodiments shown in FIG. 1, the state in which light is converged by the electrophoretic lens 123e may be called the convergence mode of the pixel structure 1, and the state in which the light is diverged by the electrophoretic lens 123f is called the divergence mode of the pixel structure 1.

Compared with the above embodiments, using a cylindrical convex lens as the electrophoretic lens 123 may have at least the following beneficial effects, but the present disclosure is not limited thereto. The cylindrical convex lenses may be less likely to flip (or rotate) in the electrophoretic medium 122 than spherical convex lenses. In this way, the cylindrical convex lens may have a faster response speed (that is, it does not need to flip to align with the direction of the electric field when driven by the electric field). Alternatively, the cylindrical convex lens may have a more precise convergence or divergence effect without causing deviation due to flipping.

Figure 4:
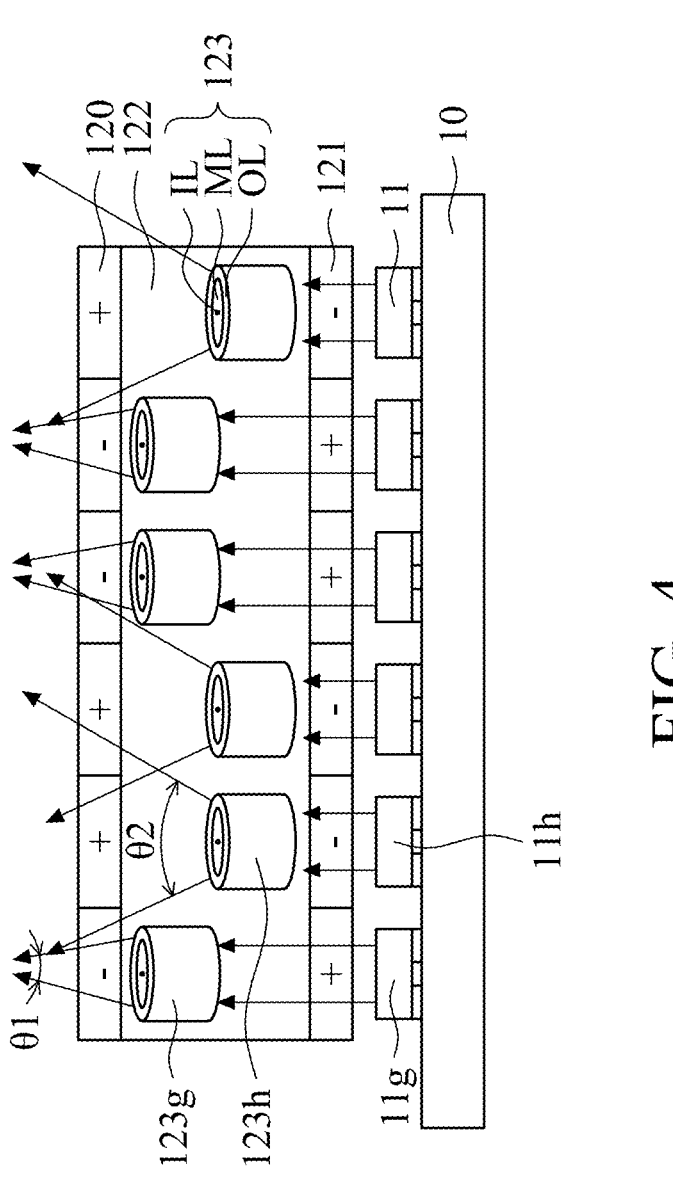
FIG. 4 is a schematic diagram of the pixel structure according to still other embodiments of the present disclosure.

FIG. 4 is a schematic diagram of the pixel structure according to still other embodiments of the present disclosure. As shown in the figure, in some embodiments, the electrophoretic lens 123 may also be a cylindrical gradient refractive index lens. Specifically, the axis of the gradient refractive index lens is parallel to the normal direction of the upper electrode 120, and the refractive index of the gradient refractive index lens gradually decrease outward from the axis of the gradient refractive index lens. For example, the refractive index of the axis IL of the gradient refractive index lens may be 1.6, the refractive index of the middle layer ML may be 1.4 or 1.2, and the refractive index of the outer layer OL may be 1.1 or 1.0, but the present disclosure is not limited thereto. In other embodiments, the refractive index of the gradient refractive index lens may also be reduced from 3.0 to 1.5.

When the distance between the electrophoretic lens 123g and the micro light-emitting diode 11g is greater than the focal length f, the light passing through the electrophoretic lens 123g has the first divergence angle θ1. On the contrary, when the distance between the electrophoretic lens 123h and the micro light-emitting diode 11h is less than the focal length f, the light passing through the electrophoretic lens 123h has the second divergence angle θ2, and the second divergence angle θ2 is greater than the first divergence angle θ1. Similar to the embodiments shown in FIG. 1, the state in which light is converged by the electrophoretic lens 123g may be called the convergence mode of the pixel structure 1, and the state in which the light is diverged by the electrophoretic lens 123h is called the divergence mode of the pixel structure 1.

Compared with the above embodiments, using a cylindrical gradient refractive index lens as the electrophoretic lens 123 may have at least the following beneficial effects, but the present disclosure is not limited thereto. Compared with convex lenses or concave lenses with concave and convex surfaces, the two ends of the cylindrical gradient refractive index lens are flat, which may effectively increase the distance that the electrophoretic lens 123 moves between the upper electrode 120 and the lower electrode 121. Alternatively, compared with convex lenses and concave lenses with concave and convex surfaces, the gradient refractive index lenses with flat surfaces may effectively have better process margins and fewer optical errors. In other words, the cylindrical gradient refractive index lens may have a more precise convergence or divergence effect.

It should be noted that although some types of lenses have been provided for illustration above, the present disclosure is not limited thereto. Any lens that may produce a magnified image or a reduced image according to its focal length may be used in the present disclosure. For example, in addition to spherical convex lenses, the convex lenses may also be plano-convex lenses, biconvex lenses, convex-concave lenses, etc., but the present disclosure is not limited thereto. In addition to biconcave lenses, the concave lenses may also be plano-concave lenses, biconcave lenses, convex-concave lenses, etc., but the present disclosure is not limited thereto. In addition to cylindrical gradient refractive index lenses (e.g., axial gradient refractive index lenses), the gradient refractive index lenses may also be radial gradient refractive index lenses, spherical gradient refractive index lenses, etc., but the present disclosure is not limited thereto.

Figure 5:
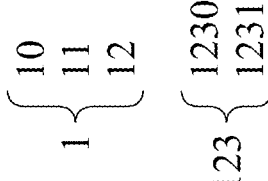
FIG. 5 is a schematic diagram of the pixel structure according to still other embodiments of the present disclosure.
Figure 5:
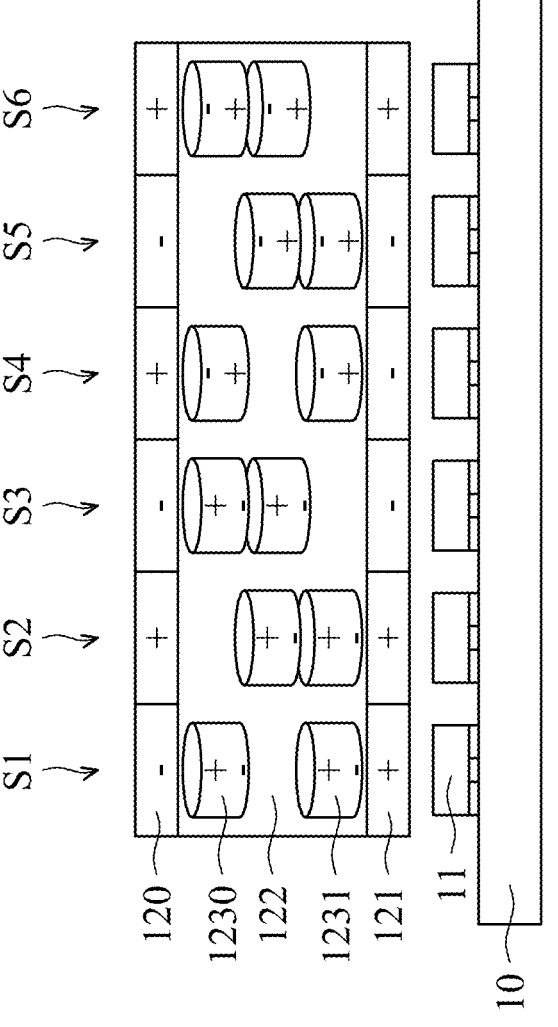

FIG. 5 is a schematic diagram of the pixel structure according to still other embodiments of the present disclosure. As shown in the figure, in some embodiments, the electrophoretic lens 123 includes the first sub-lens 1230 and the second sub-lens 1231. The first sub-lens 1230 is disposed between the upper electrode 120 and the second sub-lens 1231. In some embodiments, the first sub-lens 1230 and the second sub-lens 1231 may include similar or the same materials, but the present disclosure is not limited thereto. In some embodiments, the first sub-lens 1230 and the second sub-lens 1231 may have similar or the same refractive index, but the present disclosure is not limited thereto. In some embodiments, the first sub-lens 1230 and the second sub-lens 1231 may have similar or the same sizes, but the present disclosure is not limited thereto.

In some embodiments, the first sub-lens 1230 and the second sub-lens 1231 may be the same type of lens, such as a spherical convex lens, a biconcave lens, or a cylindrical gradient refractive index lens, but the present disclosure is not limited thereto. In other embodiments, the first sub-lens 1230 and the second sub-lens 1231 may be different types of lenses, such as any two of the plano-convex lens, biconvex lens, convex-concave lens, plano-concave lens, biconcave lens, concave-convex lens, axial gradient refractive index lenses, radial gradient refractive index lenses, spherical gradient refractive index lenses, a combination thereof, or another suitable lens.

It should be noted that in order for the upper electrode 120 and the lower electrode 121 to accurately control the first sub-lens 1230 and the second sub-lens 1231, the electrostatic force provided by the upper electrode 120 and the lower electrode 121 needs to be greater than the electrostatic force between the first sub-lens 1230 and the second sub-lens 1231.

Take the embodiments shown in FIG. 5 as an example. When the electric dipole moment direction of the first sub-lens 1230 and the electric dipole moment direction of the second sub-lens 1231 are the same, the pixel structure 1 may have six different states S1 to S6. Among them, states S1 to S3 are states in which the lower sides of the first sub-lens 1230 and the second sub-lens 1231 (that is, the sides adjacent to the lower electrode 121) are both negatively charged, and states S4 to S6 are states in which the lower sides of the first sub-lens 1230 and the second sub-lens 1231 (that is, the sides adjacent to the lower electrode 121) are both positively charged.

In the state S1, the upper electrode 120 provides negative electricity, and the lower electrode 121 provides positive electricity, so that the first sub-lens 1230 is attracted to the upper electrode 120, and the second sub-lens 1231 is attracted to the lower electrode 121. In the state S2, the upper electrode 120 provides positive electricity and the lower electrode 121 both provides positive electricity, so that the first sub-lens 1230 and the second sub-lens 1231 both are attracted to the lower electrode 121. In the state S3, the upper electrode 120 provides negative electricity and the lower electrode 121 both provides negative electricity, so that the first sub-lens 1230 and the second sub-lens 1231 both are attracted to the upper electrode 120. In the state S4, the upper electrode 120 provides positive electricity, and the lower electrode 121 provides negative electricity, so that the first sub-lens 1230 is attracted to the upper electrode 120, and the second sub-lens 1231 is attracted to the lower electrode 121. In the state S5, both the upper electrode 120 and the lower electrode 121 provide negative electricity, so that the first sub-lens 1230 and the second sub-lens 1231 both are attracted to the lower electrode 121. In the state S6, both the upper electrode 120 and the lower electrode 121 provide positive electricity, so that the first sub-lens 1230 and the second sub-lens 1231 both are attracted to the upper electrode 120.

Figure 6:
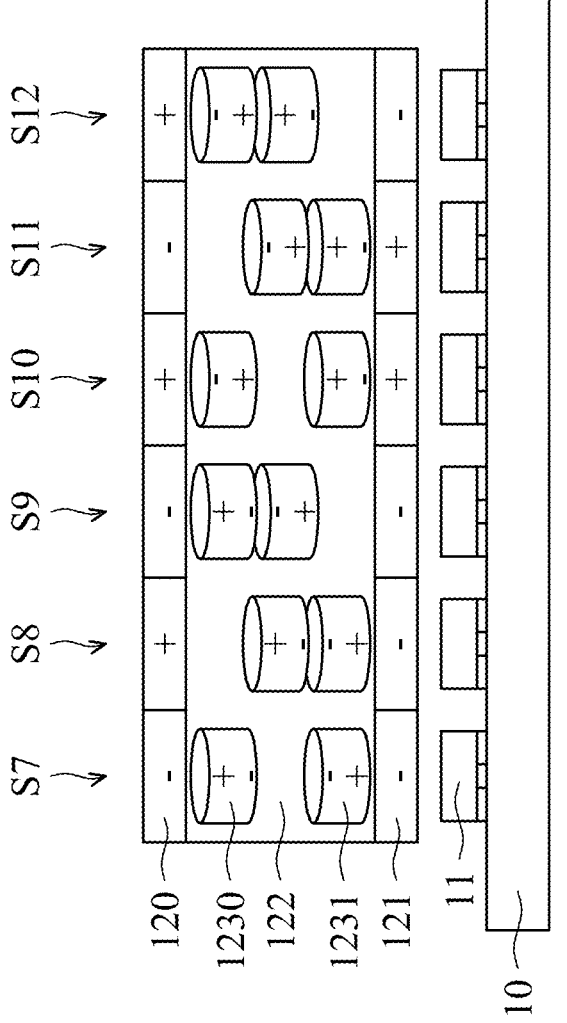
FIG. 6 is a schematic diagram of the pixel structure according to still other embodiments of the present disclosure.

FIG. 6 is a schematic diagram of the pixel structure according to still other embodiments of the present disclosure. In FIG. 6, when the electric dipole moment direction of the first sub-lens 1230 and the electric dipole moment direction of the second sub-lens 1231 are opposite, the pixel structure 1 may also have six other different states S7 to S12.

Among them, the states S7 to S9 are the states in which the adjacent two sides of the first sub-lens 1230 and the second sub-lens 1231 are negatively charged, and the states S10 to S12 are the states in which the adjacent two sides of the first sub-lens 1230 and the second sub-lens 1231 both are positively charged.

In the state S7, both the upper electrode 120 and the lower electrode 121 provide negative electricity, so that the first sub-lens 1230 is attracted to the upper electrode 120, and the second sub-lens 1231 is attracted to the lower electrode 121. In the state S8, the upper electrode 120 provides positive electricity, and the lower electrode 121 provides negative electricity, so that the first sub-lens 1230 and the second sub-lens 1231 both are attracted to the lower electrode 121. In the state S9, both the upper electrode 120 and the lower electrode 121 provide negative electricity, so that the first sub-lens 1230 and the second sub-lens 1231 both are attracted to the upper electrode 120. In the state S10, both the upper electrode 120 and the lower electrode 121 provide positive electricity, so that the first sub-lens 1230 is attracted to the upper electrode 120 and the second sub-lens 1231 is attracted to the lower electrode 121. In the state S11, the upper electrode 120 provides negative electricity, and the lower electrode 121 provides positive electricity, so that the first sub-lens 1230 and the second sub-lens 1231 both are attracted to the lower electrode 121. In the state S12, the upper electrode 120 provides positive electricity, and the lower electrode 121 provides negative electricity, so that the first sub-lens 1230 and the second sub-lens 1231 both are attracted to the upper electrode 120.

Through the above configuration, the first sub-lens 1230 and the second sub-lens 1231 may be effectively controlled, thereby achieving more diverse adjustments of the divergence angle. It should be noted that although the electrophoretic lens 123 includes two sub-lenses (for example, the first sub-lens 1230 and the second sub-lens 1231) is described above, the present disclosure is not limited thereto. In other embodiments, the electrophoretic lens 123 may also include more than two sub-lenses to achieve more complex and diverse adjustment of the divergence angle.

Figure 7:
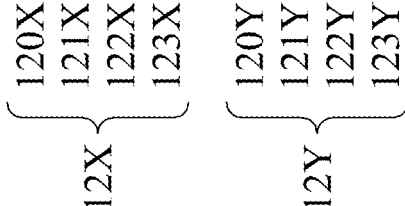
FIG. 7 is a schematic diagram of the convergence mode of the pixel structure according to some embodiments of the present disclosure.
Figure 7:
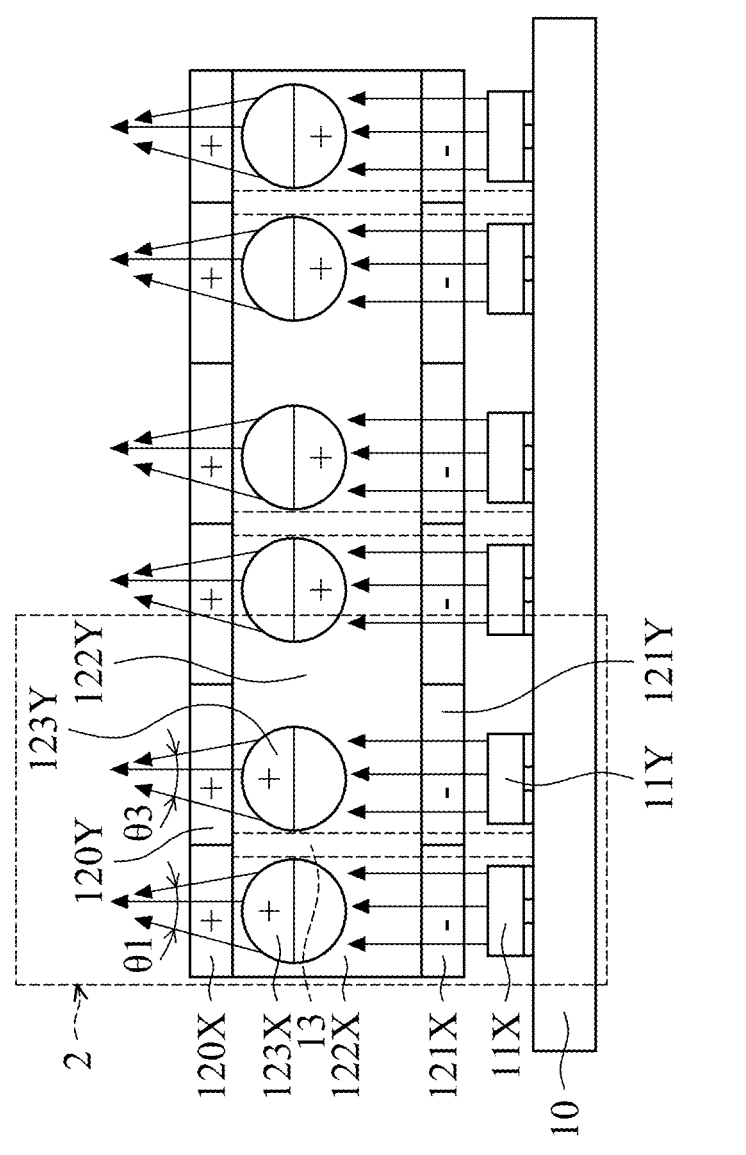

FIGS. 7 to 10 respectively are a schematic diagram of the convergence mode of the pixel structure, the schematic diagram of the convergence mode of the display device, the schematic diagram of the pixel structure in the divergence mode, and a schematic diagram of the divergence mode of the display device according to some embodiments of the present disclosure. In these embodiments, the pixel structure 2 may be used as a single sub-pixel, and multiple sub-pixels (e.g., red sub-pixel, blue sub-pixel, green sub-pixel) may constitute one pixel. As shown in FIG. 7, the pixel structure 2 includes the substrate 10, the first micro light-emitting diode 11X, the second micro light-emitting diode 11Y, the first electrophoretic structure 12X, and the second electrophoretic structure 12Y. Compared with the pixel structure 1, the pixel structure 2 includes two light-emitting diodes of the same color (for example, two red LED chips, two blue LED chips, or two green LED chips) and two electrophoretic structures located thereon (for example, the first electrophoretic structure 12X and the second electrophoretic structure 12Y). Among them, the first electrophoretic structure 12X and the second electrophoretic structure 12Y each include the upper electrodes 120X and 120Y, the lower electrodes 121X and 121Y, the electrophoretic media 122X and 122Y, and the electrophoretic lenses 123X and 123Y.

In some embodiments, the pixel structure 2 may further include the electrochromic structure 13, and the electrochromic structure 13 is disposed between the first electrophoretic structure 12X and the second electrophoretic structure 12Y. Specifically, the electrochromic structure 13 may selectively block part of the first light emitted by the first micro light-emitting diode 11X and part of the second light emitted by the second micro light-emitting diode 11Y, so as to achieve the effect of displaying different images at different viewing angles.

Figure 8:
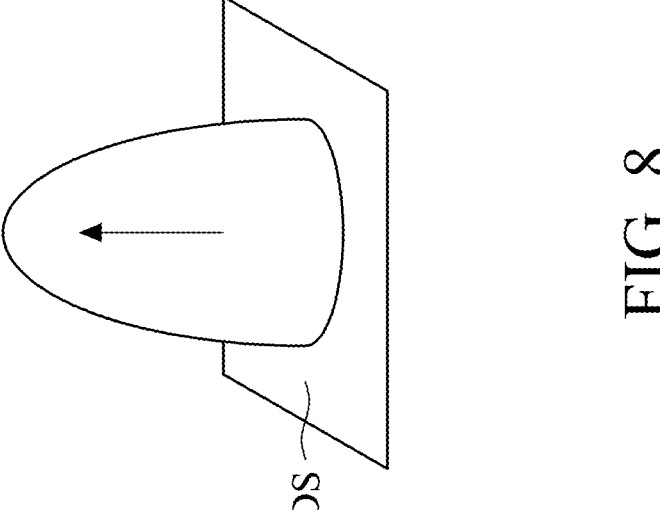
FIG. 8 is a schematic diagram of the convergence mode of the display device according to some embodiments of the present disclosure.

As shown in FIG. 7, when the electrophoretic lens 123X and the electrophoretic lens 123Y converge light (for example, the pixel structure 2 is in the convergence mode), the first light passing through the first electrophoretic structure 12X has the first divergence angle θ1, and the second light passing through the second electrophoretic structure 12Y has the third divergence angle θ3. At this time, the electrochromic structure 13 may be made transparent (that is, the electrochromic structure 13 is in the transparent state), so that the display device DS may provide display images toward the front thereof, as shown in FIG. 8. In some embodiments, the first micro light-emitting diode 11X and the second micro light-emitting diode 11Y may receive the same driving signal, and the electrochromic structure 13 does not block the first light and the second light (i.e., allow the first light and the second light to pass). In this way, the display device DS may provide a high-brightness single display image (composed of the first light and the second light) toward the front. It should be noted that although it is described here that the display device DS provides images toward the front, users located at the left front and right front of the display device DS may actually still see the images.

Figure 9:
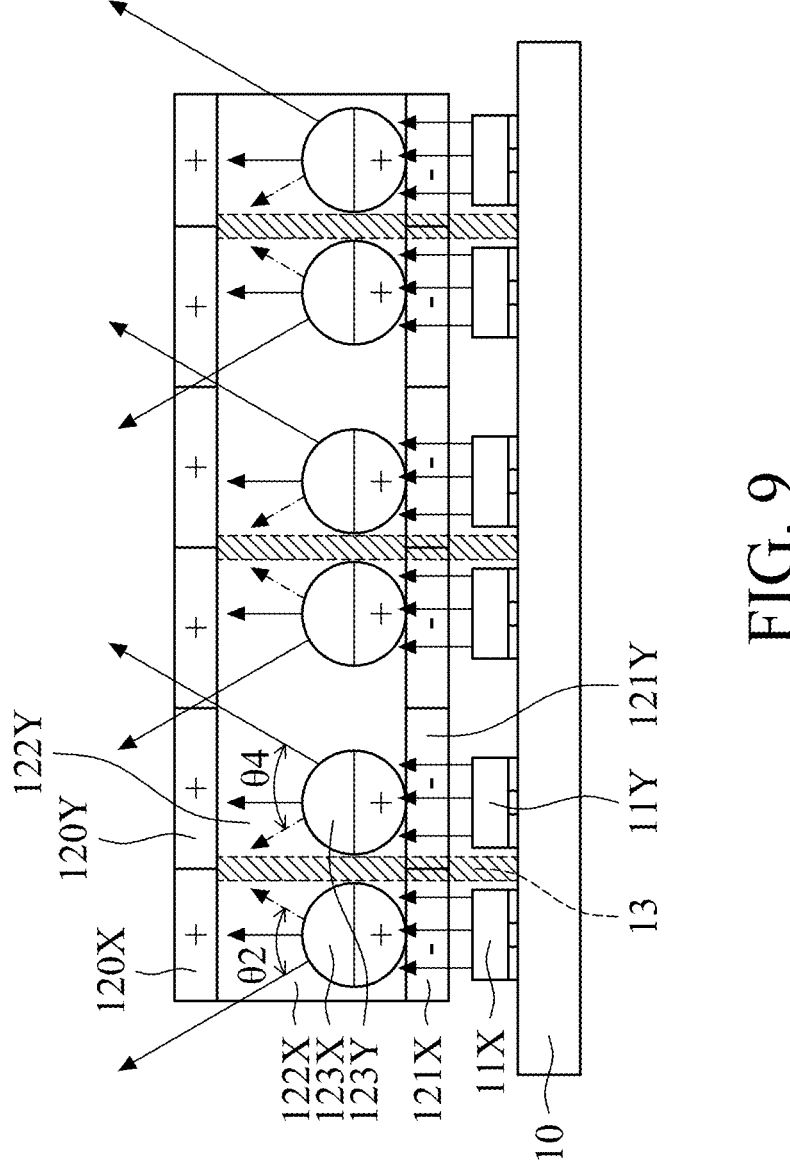
FIG. 9 is a schematic diagram of the divergence mode of the pixel structure according to some embodiments of the present disclosure.
Figure 10:
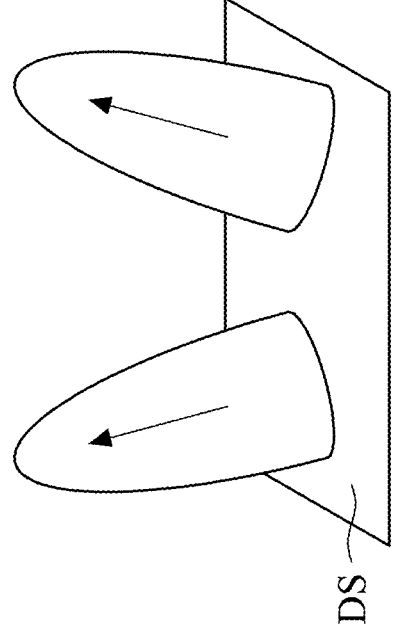
FIG. 10 is a schematic diagram of the divergence mode of the display device according to some embodiments of the present disclosure.

As shown in FIG. 9, when the electrophoretic lens 123X and the electrophoretic lens 123Y diverge light (for example, the pixel structure 2 is in the divergence mode), the first light passing through the first electrophoretic structure 12X has the second divergence angle θ2, and the second light passing through the second electrophoretic structure 12Y has the fourth divergence angle θ4, wherein the second divergence angle θ2 is greater than the first divergence angle θ1, and the fourth divergence angle θ4 is greater than the third divergence angle θ3. At this time, the electrochromic structure 13 may be made opaque (that is, the electrochromic structure 13 is in the opaque state) (for example, black) to block part of the first light and the second light, so that the display device DS may only provide display images to the left front and right front, as shown in FIG. 10. In some embodiments, the first micro light-emitting diode 11X and the second micro light-emitting diode 11Y may receive different driving signals, and the electrochromic structure 13 may block part of the first light and part of the second light. In this way, the display device DS may provide the first display image (composed only of the first light) toward the left front, and the display device DS may provide the second display image (composed only of the second light) toward the right front. Compared with the split screen in the prior art, this kind of display device DS may display different display images on the same display panel, thereby greatly improving the applicability and user experience of the display device DS.

Figure 11:
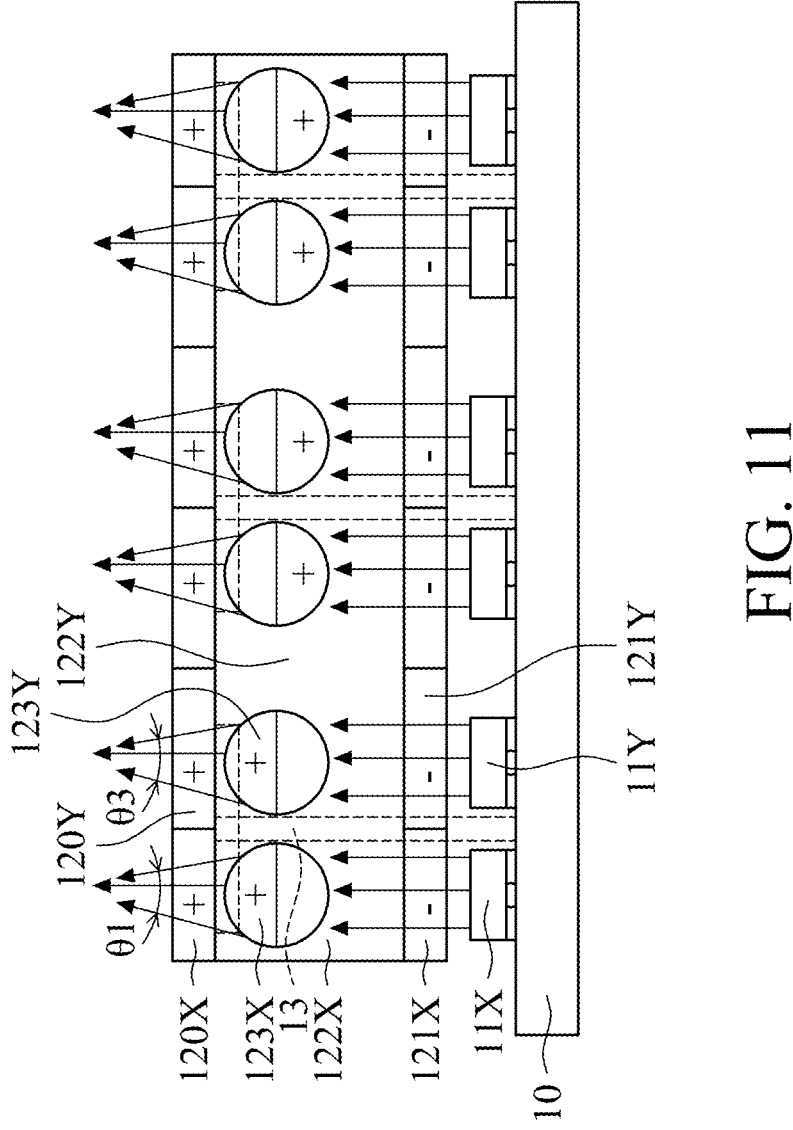
FIG. 11 is a schematic diagram of the convergence mode of the pixel structure according to other embodiments of the present disclosure.
Figure 12:
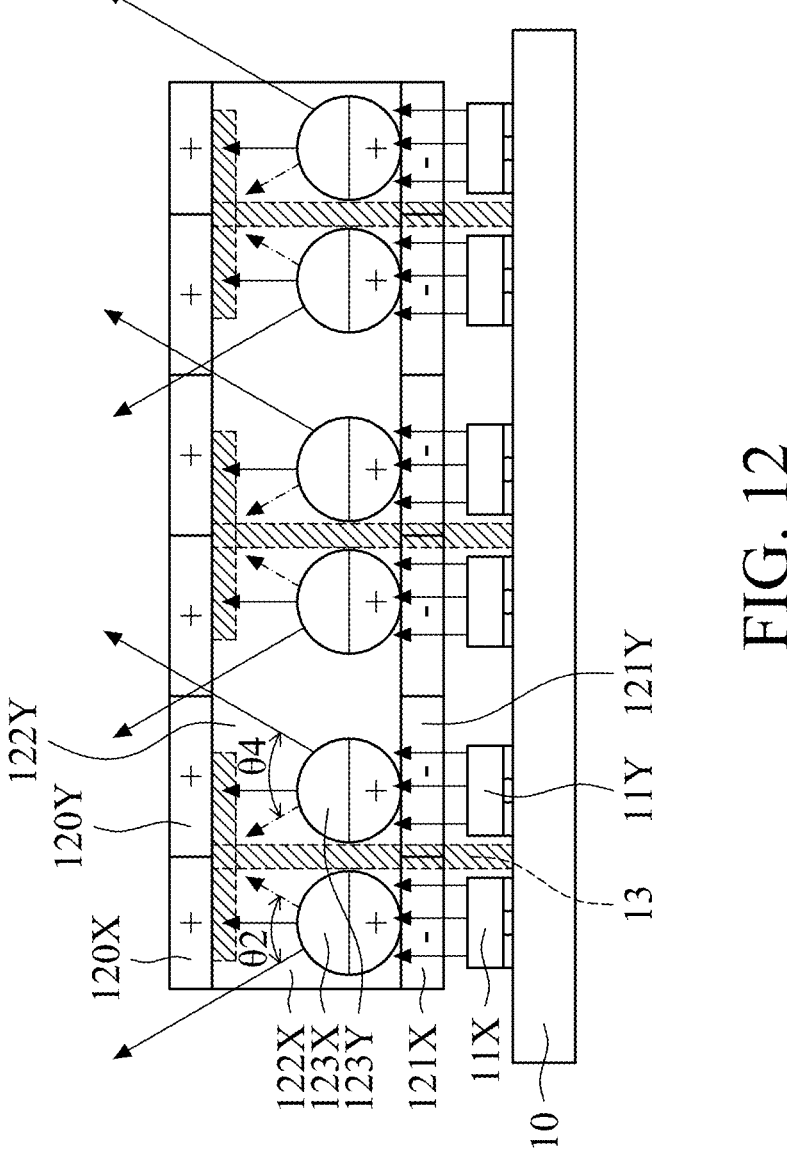
FIG. 12 is a schematic diagram of the divergence mode of the pixel structure according to other embodiments of the present disclosure.

FIGS. 11 to 12 respectively are a schematic diagram of the convergence mode of the pixel structure and a schematic diagram of the divergence mode of the pixel structure according to other embodiments of the present disclosure. As shown in the figure, compared with the embodiments of FIGS. 7 to 10, the electrochromic structure 13 in these embodiments extends further between the upper electrode 120X and the electrophoretic lens 123X in the first electrophoretic structure 12X, and extends further between the upper electrode 120Y and the electrophoretic lens 123Y in the second electrophoretic structure 12Y.

As shown in FIG. 11, when the electrophoretic lens 123X and the electrophoretic lens 123Y converge light (for example, the pixel structure 2 is in the convergence mode), the first light and the second light proceed toward the front of the display device DS. At this time, the electrochromic structure 13 may be made transparent (that is, the electrochromic structure 13 is in the transparent state), so that the display device DS may provide display images toward the front thereof. As shown in FIG. 12, when the electrophoretic lens 123X and the electrophoretic lens 123Y diverge light (for example, the pixel structure 2 is in the divergence mode), the first light and the second light are directed toward the front, left front, and right front of the display device DS. At this time, the electrochromic structure 13 may be made opaque (i.e., the electrochromic structure 13 is in the opaque state) (for example, black), so that the display device DS may only provide display images toward the left front and right front. Since the electrochromic structure 13 in these embodiments may more significantly block the first light and the second light directed forward, the first light or the second light directed directly in front of the display device DS may be prevented from leaving the display device DS, causing unexpected problems such as image overlap.

The foregoing outlines features of several embodiments of the present disclosure, so that a person of ordinary skill in the art may better understand the aspects of the present disclosure. A person of ordinary skill in the art should appreciate that, the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A pixel structure, comprising:
a substrate;
a micro light-emitting diode disposed on the substrate, wherein the micro light-emitting diode emits a light; and
an electrophoretic structure disposed on the micro light-emitting diode, wherein the electrophoretic structure comprises:
an upper electrode and a lower electrode forming an electric field;
an electrophoretic medium disposed between the upper electrode and the lower electrode, wherein the electrophoretic medium has a first refractive index; and
an electrophoretic lens disposed in the electrophoretic medium, wherein the electrophoretic lens has a second refractive index, and the second refractive index is different from the first refractive index;
wherein the electrophoretic lens moves away from or toward the micro light-emitting diode by being driven by an electrostatic force generated by the electric field, so that the light passing through the electrophoretic lens has a first divergence angle or a second divergence angle after refracting, and the first divergence angle is different from the second divergence angle.

2. The pixel structure as claimed in claim 1, wherein on a projection plane, a projected area of the electrophoretic lens accounts for at least 50% of a projected area of the micro light-emitting diode.

3. The pixel structure as claimed in claim 1, wherein the first refractive index is less than the second refractive index.

4. The pixel structure as claimed in claim 3, wherein the first refractive index is less than 1.5, and the second refractive index is greater than or equal to 1.5.

5. The pixel structure as claimed in claim 3, wherein the electrophoretic lens is a convex lens, and the convex lens has a focal length,
when a distance between the convex lens and the micro light-emitting diode is greater than the focal length, the light passing through the convex lens has the first divergence angle,
when the distance between the convex lens and the micro light-emitting diode is less than the focal length, the light passing through the convex lens has the second divergence angle, and the second divergence angle is greater than the first divergence angle.

6. The pixel structure as claimed in claim 3, wherein the electrophoretic lens is a gradient refractive index lens, the gradient refractive index lens has a focal length, and an axis of the gradient refractive index lens is parallel to a normal direction of the upper electrode, wherein a refractive index of the gradient refractive index lens gradually decreases from the axis of the gradient refractive index lens outward,
when a distance between the gradient refractive index lens and the micro light-emitting diode is greater than the focal length, the light passing through the gradient refractive index lens has the first divergence angle,
when the distance between the gradient refractive index lens and the micro light-emitting diode is less than the focal length, the light passing through the gradient refractive index lens has the second divergence angle, and the second divergence angle is greater than the third divergence angle.

7. The pixel structure as claimed in claim 1, wherein the first refractive index is greater than the second refractive index.

8. The pixel structure as claimed in claim 7, wherein the first refractive index is greater than 1.5, and the second refractive index is less than or equal to 1.5.

9. The pixel structure as claimed in claim 7, wherein the electrophoretic lens is a concave lens.

10. The pixel structure as claimed in claim 1, wherein the electrophoretic lens comprises a first sub-lens and a second sub-lens, the first sub-lens is disposed between the upper electrode and the second sub-lens, wherein a direction of an electric dipole moment of the first sub-lens and a direction of an electric dipole moment of the second sub-lens are the same, and an electrostatic force provided by the upper electrode and the lower electrode is greater than an electrostatic force between the first sub-lens and the second sub-lens.

11. The pixel structure as claimed in claim 1, wherein the electrophoretic lens comprises a first sub-lens and a second sub-lens, the first sub-lens is disposed between the upper electrode and the second sub-lens, wherein a direction of an electric dipole moment of the first sub-lens and a direction of an electric dipole moment of the second sub-lens are opposite, and an electrostatic force provided by the upper electrode and the lower electrode is greater than an electrostatic force between the first sub-lens and the second sub-lens.

12. A pixel structure, comprising:

a substrate;

a first micro light-emitting diode and a second micro light-emitting diode disposed on the substrate, wherein the first micro light-emitting diode and the second micro light-emitting diode respectively emit a first light and a second light with the same color;

a first electrophoretic structure and a second electrophoretic structure respectively disposed on the first micro light-emitting diode and the second micro light-emitting diode, wherein the first electrophoretic structure and the second electrophoretic structure respectively comprise:

an upper electrode and a lower electrode forming an electric field;

an electrophoretic medium disposed between the upper electrode and the lower electrode, wherein the electrophoretic medium has a first refractive index; and an electrophoretic lens disposed in the electrophoretic medium, wherein the electrophoretic lens has a second refractive index, and the second refractive index is different from the first refractive index; and an electrochromic structure disposed between the first electrophoretic structure and the second electrophoretic structure and selectively switched between a transparent state or an opaque state, wherein the opaque state is used to shield a part of the first light and the second light;

wherein the electrophoretic lens of the first electrophoretic structure moves away from or toward the first micro light-emitting diode by being driven by an electrostatic force generated by the electric field, so that the first light passing through the first electrophoretic structure has a first divergence angle or a second divergence angle after refracting, and the first divergence angle is different from the second divergence angle, wherein the electrophoretic lens of the second electrophoretic structure moves away from or toward the second micro light-emitting diode by being driven by an electrostatic force generated by the electric field, so that the second light passing through the second electrophoretic structure has a third divergence angle or a fourth divergence angle after refracting, and the third divergence angle is different from the fourth divergence angle.

13. The pixel structure as claimed in claim 12, wherein the second divergence angle is greater than the first divergence angle, and the first light passing through the first electrophoretic structure has the first divergence angle, wherein the fourth divergence angle is greater than the third divergence angle, and the second light passing through the second electrophoretic structure has the third divergence angle.

14. The pixel structure as claimed in claim 13, wherein the first micro light-emitting diode and the second micro light-emitting diode receive the same driving signal, and the electrochromic structure is in the transparent state to allow the first light and the second light to pass through.

15. The pixel structure as claimed in claim 12, wherein the second divergence angle is greater than the first divergence angle, and the first light passing through the first electrophoretic structure has the second divergence angle, wherein the fourth divergence angle is greater than the third divergence angle, and the second light passing through the second electrophoretic structure has the fourth divergence angle.

16. The pixel structure as claimed in claim 15, wherein the first micro light-emitting diode and the second micro light-emitting diode receive different driving signals, and the electrochromic structure is in the opaque state to shield part of the first light and the second light.

17. The pixel structure as claimed in claim 12, wherein the electrochromic structure further extends between the upper electrodes and the electrophoretic lenses of the first electrophoretic structure and the second electrophoretic structure.

* * * * *